June 30, 1953     W. E. STANTON     2,643,829
FISHING REEL
Filed Dec. 16, 1947
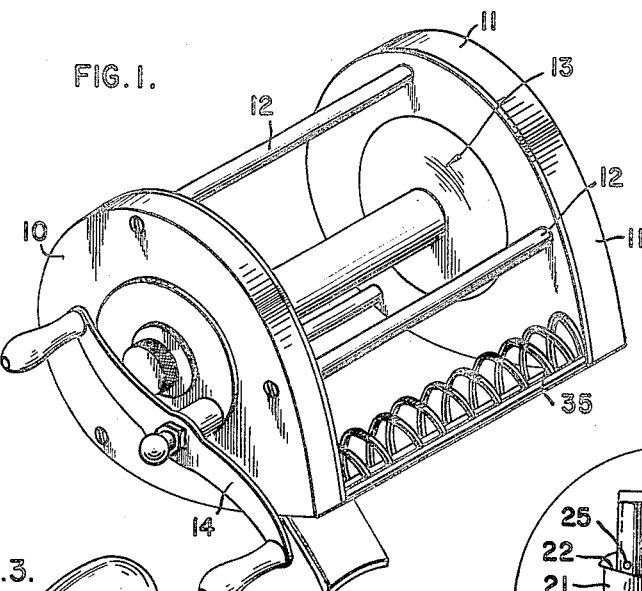
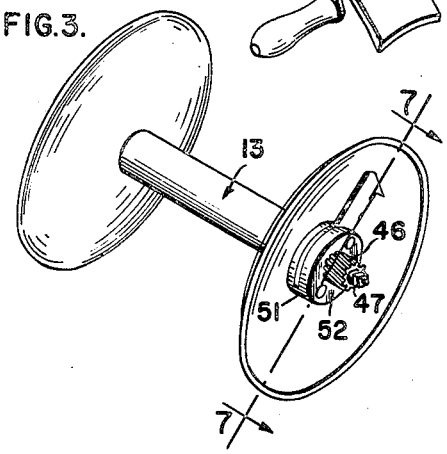
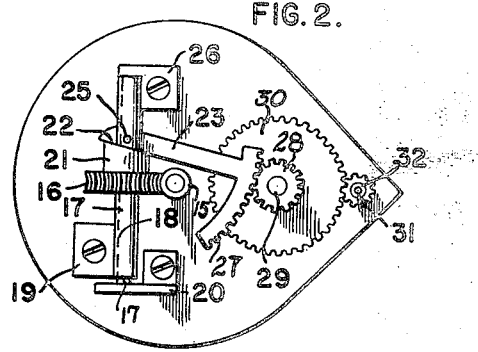
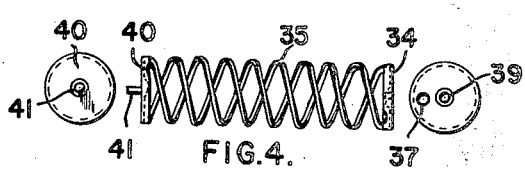
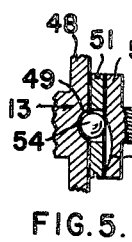
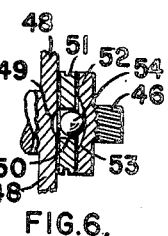
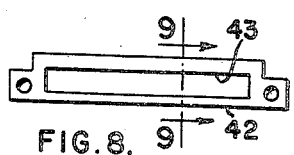
WILLIAM E. STANTON
*INVENTOR.*
BY Patented June 30, 1953

2,643,829

UNITED STATES PATENT OFFICE 2,643,829

FISHING REEL

William E. Stanton, Corpus Christi, Tex.

Application December 16, 1947, Serial No. 791,987

3 Claims. (Cl. 242—84.4)

In general, the present invention relates to fishing tackle, and more specifically, has reference to a fishing reel.

Accordingly, an important object of this invention is to provide a fishing reel with means whereby the fishing line is moved laterally of the spool during the winding process.

Yet a further object of the present invention is to provide a fishing reel with a mechanism for effecting level winding, which mechanism is located in the off-hand or left side of the reel assembly.

And still another object of my invention is to provide a cam actuated mechanism for operating the level winding device of the reel.

An additional object of the invention is to provide a mechanism whereby the guiding device may be actuated alternately in opposite directions so that the line may be moved in alternate directions laterally of the spool during the winding process or during the casting operation.

Still another object of my invention is to provide a mechanism for accomplishing the above objects which may be incorporated with most conventional fishing reels currently employed.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a view in perspective of a fishing reel embodying the features of the present invention.

Figure 2 is an elevational view of the off-hand side of the reel depicting the mechanism for actuating the line guide device.

Figure 3 is a perspective view of the spool illustrating the component parts of the free spooling device.

Figure 4 is an assembly view of the line guide.

Figure 5 is a detail view on an enlarged scale of the free spooling device showing the relationship of the parts during rotation of the spool.

Figure 6 is a view similar to Figure 5 illustrating the parts during the free spooling operation.

Figure 7 is a sectional view taken along the line 7—7 of Figure 3.

Figure 8 is an elevational view of the line guide guard.

Figure 9 is a sectional view along the line 9—9 of Figure 8, the view looking in the direction of the arrows.

Figure 10 is a detail sectional view of the connection between the gear and the line guide.

Referring to Figure 1, I have illustrated a fishing reel including an on-hand casing 10, an off-hand casing 11 which are held in proper spaced apart parallel relationship by pillars 12 suitably anchored at each end to the respective casings. A spool assembly 13 is mounted in the casings 10 and 11 in any convenient manner. The casing 10 contains the usual spool actuating mechanism which is operated by rotation of a crank or handle 14. The shaft of the reel carries a worm 15 which is suitably journaled in the side wall of the off-hand casing 11. The worm 15 meshes with a worm wheel 16 carried by a shaft 17 rotatably mounted in a sleeve 18 supported by a member 19. The end of the shaft 17 for the worm wheel 16 is journaled in a bearing 20. Integrally formed with the worm wheel 16 is an extension 21 of circular configuration, the top wall of which is provided with a cam surface 22. An arm 23 is adapted to contact cam surface 22 and a pin 25 set friction tight in a support 26 is the bearing for arm 23. The outer end of the arm 23 is provided with a segmental gear 27 which meshes with a pinion 28 carried by a shaft 29 suitably journaled in the end walls of the casing 11. The pinion 28 is fixedly secured to move with a cog wheel 30 of considerably greater diameter which is also carried by the shaft 29, and the cog wheel 30 meshes with a gear 31 supported by a shaft 32 journaled in the casing 11.

Secured to the opposite end of the shaft 32 is a circular plate 33 which is located adjacent end 34 of a spiral line guide 35. The plate 33 carries a pin 36 which enters an aperture 37 in the end plate 34 of the guide 35. A second pin 38 projects into a centrally disposed aperture 39 also provided in the end plate 34. The opposite end of the guide 35 carries a plate 40 having a centrally disposed pin or trunnion 41 which is journaled in a bearing (not shown) formed in the on-hand casing 10. The guide 35 is protected by a clip guard 42 fabricated from spring metal and which may be suitably clipped into position on the reel. An elongated slot 43 is formed in the guard, and the guard is bent at an angle along the upper longitudinal edge, as shown at 44. The guard will function to protect the line guide 35 and, in addition, prevent fouling of the line.

Manifestly, when the worm 15 is rotated, the worm wheel 16 will likewise rotate, simultaneously effecting rotation of the extension 21 which will, of course, by virtue of the cam surface 22, oscillate the arm 23 and therefore cause the guide 35 to rotate alternately in opposite directions by reason of the segmental gear 27, pinion 28, cog wheel 30 and gear 31. This mechanism for effecting actuation of the guide line 35 is quite simple in structural detail, positive in operation, and is capable of being inexpensively manufactured.

As hereinabove adverted to, another important feature of the present invention resides in the free spooling device. This mechanism is best shown in Figures 3, 5 and 6. The free spooling device is located within the on-hand casing 10, and the shaft of the spool 13 is provided with a gear 46 suitably secured to the outer end thereof, as shown at 47. Flange 48 of the spool 13 is provided with recesses 49 which are in alinement with apertures 50 located in a disk 51 disposed in parallel relation with respect to the flange of the spool. A second disk 52 provided with recesses 53 is carried by the gear 46. The balls 54 are disposed within the apertures 50 and it can be seen that the aperture is slightly larger than the ball. When the reel is being used to wind cord thereon, the rotation of the crank 14 will rotate the gear 46, which in turn will revolve the disk 52, causing the balls 54 to enter the recesses 49 in the flange of the spool 13, as shown in Figure 5. However, upon release of the crank 14, each ball 54 will be forced into the recess 53 of the disk 52, out of the recess 49 and the reel is then free to rotate, as perhaps best depicted in Figure 6. By reason of the relationship of the parts of this device, immediate locking may be effected between the crank or handle 14 and the spool 13 for instantaneous operation thereof.

It will be readily appreciated from the foregoing description that I have provided a novel mechanism for effecting actuation of the line guide 35. The gear arrangement for operating the line guide is quite simple in detail and may be readily incorporated in the off-hand casing of the reel assembly. Access may be readily had to the gear train in the event repair or replacement of any of the parts is required. In addition, due to the spiral nature of the guide 35, there can be no fouling of the line about the guide.

The free spooling construction provided in the on-hand casing of the reel includes few essential parts and locking of these parts to effect winding of the line is instantaneously accomplished by manipulation of the crank or handle. On the other hand, upon release of the handle, the spool 13 is in condition to immediately free spool.

The invention is not to be confined to any strict conformity with the showing in the drawing, but may be changed or modified so long as such changes or modifications mark no material departure from the salient features of the invention as expressed in the appended claims.

I claim:
1. In a fishing reel having on-hand and off-hand gear casings maintained in parallel spaced relationship by supporting members, a rotatable spool shaft mounted in said casings, a worm on said spool shaft located within the off-hand casing, a worm wheel in mesh with said worm, an extension on the worm wheel, a single angular flat surface on the free end of said extension defining a cam surface, an oscillatably mounted arm actuated by said cam surface, a gear segment on said arm, a gear train actuated by the gear segment, a line guide mounted for rotation between said on-hand and off-hand casings, and means for imparting movement from the gear train to said line guide.

2. In a fishing reel having on-hand and off-hand gear casings maintained in parallel spaced relationship by supporting members, a rotatable spool shaft mounted in said casings, a worm on said spool shaft located within one of said casings, a worm wheel in mesh with said worm, an extension on the worm wheel, a single angular flat surface on the free end of said extension defining a cam surface, an oscillatably mounted arm actuated by said cam surface, a gear segment on said arm, a gear train actuated by the gear segment, a line guide mounted for rotation between said on-hand and off-hand casings, and means for imparting movement from the gear train to said line guide.

3. In a fishing reel having on-hand and off-hand gear casings maintained in parallel spaced relationship by supporting members, a rotatable spool shaft mounted in said casings, a worm on said spool shaft located within one of said casings, a worm wheel in mesh with said worm, a cylindrical extension integrally formed with said worm wheel, a single angular flat surface on the free end of the cylindrical extension defining a cam surface, an oscillatably mounted arm disposed in the path of movement of said cam surface for actuation by said cam surface, a gear segment on said arm, a gear train actuated by the gear segment, a line guide mounted for rotation between said on-hand and off-hand casings, and means to impart movement from the gear train to said line guide.

WILLIAM E. STANTON.

References Cited in the file of this patent

UNITED STATES PATENTS

| Number | Name | Date |
|---|---|---|
| 929,867 | Meisselbach et al. | Aug. 3, 1909 |
| 1,472,684 | Schmid | Oct. 30, 1923 |
| 1,715,803 | Welch | June 4, 1929 |
| 1,964,965 | Smelser | July 3, 1934 |
| 1,973,686 | Maynes | Sept. 11, 1934 |
| 2,163,030 | Gehr | June 20, 1939 |
| 2,244,889 | Maynes | June 10, 1941 |
| 2,331,919 | Maynes | Oct. 19, 1943 |